United States Patent
Mizuno et al.

(10) Patent No.: US 11,027,722 B2
(45) Date of Patent: **\*Jun. 8, 2021**

(54) YEILDING ACTION ASSISTANCE SYSTEM

(71) Applicant: Toyota Jidosha Kabushiki Kaisha, Toyota (JP)

(72) Inventors: Junya Mizuno, Sunto-gun (JP); Ayumu Sagawa, Toyota (JP)

(73) Assignee: Toyota Jidosha Kabushiki Kaisha, Toyota (JP)

(\*) Notice: Subject to any disclaimer, the term of this patent is extended or adjusted under 35 U.S.C. 154(b) by 0 days.

This patent is subject to a terminal disclaimer.

(21) Appl. No.: 16/848,600

(22) Filed: Apr. 14, 2020

(65) Prior Publication Data

US 2020/0238975 A1 Jul. 30, 2020

Related U.S. Application Data

(63) Continuation of application No. 15/968,208, filed on May 1, 2018, now Pat. No. 10,766,481.

(30) Foreign Application Priority Data

May 19, 2017 (JP) .............................. JP2017-100261

(51) Int. Cl.
*B60W 30/00* (2006.01)
*B60W 10/04* (2006.01)
(Continued)

(52) U.S. Cl.
CPC ............ *B60W 30/00* (2013.01); *B60W 10/04* (2013.01); *B60W 10/18* (2013.01); *B60W 50/14* (2013.01);
(Continued)

(58) Field of Classification Search
CPC ...... B60W 30/00; B60W 50/16; B60W 10/18; B60W 50/14; B60W 10/04;
(Continued)

(56) References Cited

U.S. PATENT DOCUMENTS

| 6,252,521 | B1 * | 6/2001 | Griffin | ................. | G08G 1/0965 |
| | | | | | 340/384.1 |
| 6,940,422 | B1 * | 9/2005 | Bachelder | .............. | G08G 1/087 |
| | | | | | 340/906 |

(Continued)

FOREIGN PATENT DOCUMENTS

| JP | 10-86761 A | 4/1998 |
| JP | 2005-228111 | 8/2005 |

(Continued)

*Primary Examiner* — Mussa A Shaawat
(74) *Attorney, Agent, or Firm* — Oblon, McClelland, Maier & Neustadt, L.L.P.

(57) ABSTRACT

A yielding action assistance system for assisting a vehicle driver to take an appropriate action in yielding to a passing emergency vehicle. The yielding action assistance system comprises: a detector that detects a proximity of the emergency vehicle; an information collector that collects a road information and information about the emergency vehicle and other vehicle; a target zone determiner that sets and updates a target zone to pull over the vehicle based on the information about the other vehicle and the road; and a notifier that informs a driver about the target zone.

14 Claims, 8 Drawing Sheets

(51) Int. Cl.
*B60W 10/18* (2012.01)
*B60W 50/14* (2020.01)
*B60W 50/16* (2020.01)
*G05D 1/02* (2020.01)
*B60W 10/20* (2006.01)
*B60W 30/16* (2020.01)

(52) U.S. Cl.
CPC ........... *B60W 50/16* (2013.01); *G05D 1/0223* (2013.01); *B60W 10/20* (2013.01); *B60W 30/16* (2013.01); *B60W 2050/143* (2013.01); *B60W 2050/146* (2013.01); *B60W 2400/00* (2013.01); *B60W 2520/10* (2013.01); *B60W 2540/10* (2013.01); *B60W 2540/12* (2013.01); *B60W 2540/18* (2013.01); *B60W 2540/30* (2013.01); *B60W 2552/05* (2020.02); *B60W 2552/20* (2020.02); *B60W 2552/30* (2020.02); *B60W 2554/80* (2020.02); *B60W 2554/801* (2020.02); *B60W 2555/60* (2020.02); *B60W 2556/45* (2020.02); *B60W 2710/18* (2013.01); *B60W 2710/202* (2013.01); *B60W 2710/207* (2013.01); *B60W 2720/10* (2013.01); *G05D 2201/0213* (2013.01)

(58) Field of Classification Search
CPC ......... B60W 2552/05; B60W 2552/30; B60W 2555/60; B60W 30/16; G05D 2201/0213; G05D 1/0223
See application file for complete search history.

(56) References Cited

U.S. PATENT DOCUMENTS

| | | | |
|---|---|---|---|
| 9,841,767 B1* | 12/2017 | Hayward | G05D 1/0285 |
| 9,947,221 B1* | 4/2018 | Mazzola | G08G 1/096716 |
| 10,109,190 B1* | 10/2018 | Baptiste | G08G 1/0965 |
| 2002/0008635 A1* | 1/2002 | Ewing | G08G 1/0965 340/902 |
| 2004/0036627 A1* | 2/2004 | Knoski | G08G 1/0965 340/902 |
| 2010/0081411 A1* | 4/2010 | Montenero | G08B 21/0233 455/404.2 |
| 2010/0253594 A1* | 10/2010 | Szczerba | G08G 1/165 345/7 |
| 2011/0181443 A1* | 7/2011 | Gutierrez | G01C 21/3691 340/990 |
| 2012/0306664 A1* | 12/2012 | Geter | G08G 1/166 340/903 |
| 2014/0085107 A1* | 3/2014 | Gutierrez | G08G 1/096716 340/905 |
| 2014/0300455 A1* | 10/2014 | Tsuzuki | B60L 3/0069 340/425.5 |
| 2015/0269842 A1* | 9/2015 | Ignaczak | B60Q 1/44 701/118 |
| 2016/0357262 A1* | 12/2016 | Ansari | G06Q 10/0833 |
| 2017/0066374 A1* | 3/2017 | Hoye | B60W 30/08 |
| 2017/0372602 A1* | 12/2017 | Gilliland | G01S 17/66 |
| 2018/0050696 A1* | 2/2018 | Misu | A61B 5/0077 |
| 2018/0208188 A1* | 7/2018 | Williams | B60T 8/17 |
| 2020/0008028 A1* | 1/2020 | Yang | H04W 4/48 |

FOREIGN PATENT DOCUMENTS

| | | |
|---|---|---|
| JP | 2006-184213 | 7/2006 |
| JP | 2008-84004 | 4/2008 |
| JP | 2010-20371 | 1/2010 |
| JP | 2010-67165 A | 3/2010 |
| JP | 2010-237792 A | 10/2010 |
| JP | 2011-79388 | 4/2011 |
| JP | 2014-154128 | 8/2014 |

* cited by examiner

YEILDING ACTION ASSISTANCE SYSTEM

CROSS REFERENCE TO RELATED APPLICATIONS

The present application is a continuation of U.S. application Ser. No. 15/968,208 filed May 1, 2018, which claims the benefit of Japanese Patent Application No. 2017-100261 filed May 19, 2017, the entire disclosure of which each of which are incorporated herein by reference in its entirety.

BACKGROUND

Field of the Disclosure

Embodiments of the present application relate to the art of a yielding action assistance system for assisting a vehicle to yield to an emergency vehicle.

Discussion of the Related Art

Following prior art documents describe vehicle guiding systems for sending information about an emergency vehicle to a vehicle to clear the way for the emergency vehicle.

JP-A-2014-154128 describes an emergency vehicle passage support system configured to allow an emergency vehicle pass in a preferential manner. Specifically, the support system taught by JP-A-2014-154128 is configured to guide other vehicle automatically to a shoulder of a road and then stop the other vehicle, in the event that the emergency vehicle approaches. The support system taught by JP-A-2014-154128 is further configured to change the traffic light to green when the emergency vehicle approaches an intersection.

JP-A-2011-79388 describes a control device for vehicle configured to detect the approach of an emergency vehicle by inter-vehicle communication, and to restrict a vehicle speed by adjusting a reaction force against a pedal force applied to an accelerator pedal, when the vehicle speed is higher than a predetermined level in the event that the emergency vehicle approaches.

JP-A-2008-84004 also describes a vehicle driving support system configured to detect the approach of an emergency vehicle by inter-vehicle communication. The vehicle driving support system taught by JP-A-2008-84004 is further configured to provide different information with a driver by alarm or the like, depending on whether or not the driver takes a yielding action in the event that the emergency vehicle approaches.

JP-A-2005-228111 describes a vehicle retreat instruction device configured to instruct vehicles running on a same lane with an emergency vehicle to take a yielding action in order to allow the emergency vehicle to pass. Specifically, the instruction device taught by JP-A-2005-228111 is configured to specify the vehicles travelling on an expected route of the emergency vehicle, and to determine contents of the yielding action to be taken by the vehicles to allow the emergency vehicle to pass.

JP-A-2006-184213 describes a route search system for emergency vehicle configured to search a route for the emergency vehicle from a start point to a destination taking account of a road width. Further, JP-A-2010-20371 describes a vehicle control system for guiding a vehicle in the event of disaster. The control system taught by JP-A-2010-20371 is configured to find an available space in a road shoulder, and guide the vehicle autonomously to the available space and stops the vehicle, upon reception of disaster information.

According to the teachings of JP-A-2014-154128, the emergency vehicle is allowed to travel smoothly if all of the other vehicles can be operated autonomously. However, if a vehicle that can be operated only manually also travels on the expected route of the emergency vehicle, the emergency vehicle has to travel while passing around the vehicle being operated manually. In addition, the vehicles operated autonomously may not be guided smoothly to the road shoulder and hence it may take longer time to clear the way for the emergency vehicle.

According to the teachings of JP-A-2011-79388, in the event that the emergency vehicle approaches, the vehicle may not move to an safety area smoothly due to the restriction on the vehicle speed. Further, the vehicle may not be accelerated sufficiently depending on the traffic conditions, and hence it may take longer time to clear the way for the emergency vehicle.

According to the teachings of JP-A-2008-84004, although the vehicle having the driving support system can be assisted to take a yielding action, other vehicles around the vehicle may not be controlled to clear the way for the emergency vehicle. Further, an action taken to travel in a cooperative manner with the other vehicles may be recognized erroneously as the yielding action. Therefore, the vehicle may not take an appropriate yielding action cooperatively with the other vehicles.

According to the teachings of JP-A-2005-228111, safety spaces are allotted for the specified vehicles travelling on the expected route of the emergency vehicle so that it is possible to clear the way promptly for the emergency vehicle. However, if some of the specified vehicles do not follow the instruction, the allotted safety spaces will not work properly, and the specified vehicles following the instruction may be confused.

The route search system taught by JP-A-2006-184213 may search an appropriate route for the emergency vehicle, but may not control the other vehicles on the planned route to clear the way for the emergency vehicle. The control system taught by JP-A-2010-20371 may find an available space in the road shoulder in the event of disaster, but may not control the other vehicles to clear the way for the emergency vehicle.

SUMMARY

Aspects of the present disclosure have been conceived noting the foregoing technical problems, and it is therefore an object of the present disclosure to provide a yielding action assistance system for assisting a vehicle driver to take an appropriate action in yielding to a passing emergency vehicle.

An embodiment of the present disclosure relates to a yielding action assistance system that assists a vehicle to yield to a passing emergency vehicle. In order to achieve the above-explained objective, according to the embodiment of the present disclosure, the yielding action assistance system is provided with: a detector that detects a proximity of the emergency vehicle to the vehicle; an information collector that collects information about a road on which the vehicle travels, and information about the emergency vehicle and other vehicle travelling on the same road with the vehicle; a target zone determiner that sets a target zone to pull over the vehicle to clear the way for the emergency vehicle based on the information about the other vehicle and the road, and that updates the target zone continuously based at least on the information about the other vehicle; and a notifier that informs a driver about the target zone.

In a non-limiting embodiment, the information collector may be configured to collect information about the emergency vehicle and the vehicle, and the target zone determiner may be configured to update the target zone until the emergency vehicle overtakes the vehicle.

In a non-limiting embodiment, the target zone determiner may be further configured to set the target zone in a shoulder of the road at a site at which a width of the target zone can be maintained wider than a width of the emergency vehicle, and a distance between the vehicle and the other vehicle to be stopped in an oncoming lane is maintained longer than a length of the emergency vehicle.

In a non-limiting embodiment, the yielding action assistance system may further comprise a first drive force controller that changes a drive force to increase a deceleration force when the driver pulls over the vehicle to the target zone indicated by the notifier.

In a non-limiting embodiment, the first drive force controller may be configured to calculate a distance between the vehicle and the target zone, and to change the drive force when the distance between the vehicle and the target zone is reduced to a threshold value.

In a non-limiting embodiment, the first drive force controller may be further configured to detect a speed of the vehicle, and to increase the threshold value with an increase in the speed of the vehicle.

In a non-limiting embodiment, the first drive force controller may be further configured to calculate a distance between the vehicle and the target zone, and to change the drive force to increase the deceleration force with a reduction in the distance between the vehicle and the target zone.

In a non-limiting embodiment, the target zone determiner may be further configured to set the target zone in a lane other than an innermost lane while avoiding interference with the other vehicle, in a case that the vehicle travels on a multi-lane road.

In a non-limiting embodiment, the yielding action assistance system may further comprise a second drive force controller that changes a drive force to increase a deceleration force after the vehicle arrives at the target zone.

Thus, according to the embodiment of the present disclosure, the target zone to pull over the vehicle is set based on the information about the emergency vehicle and the other vehicle. The target zone is updated continuously and the driver of the vehicle is informed about the updated target zone. According to the embodiment of the present disclosure, therefore, the driver is allowed to pull over the vehicle smoothly to the target zone so as to yield to the passing emergency vehicle, even if the driver is not aware of proximity of the emergency vehicle. In other words, the driver of the vehicle is allowed to clear the way smoothly for the passing emergency vehicle depending on a situation on the road.

In addition, according to the embodiment of the present disclosure, the deceleration force applied to the vehicle is increased to stop the vehicle or to reduce the speed of the vehicle when pulling over the vehicle to the target zone or when travels within the target zone. According to the embodiment of the present disclosure, therefore, the driver of the vehicle is allowed to yield to the emergency vehicle promptly.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTI S N S F THE PREFERRED EMBODIMENT(S)

Figure 1:
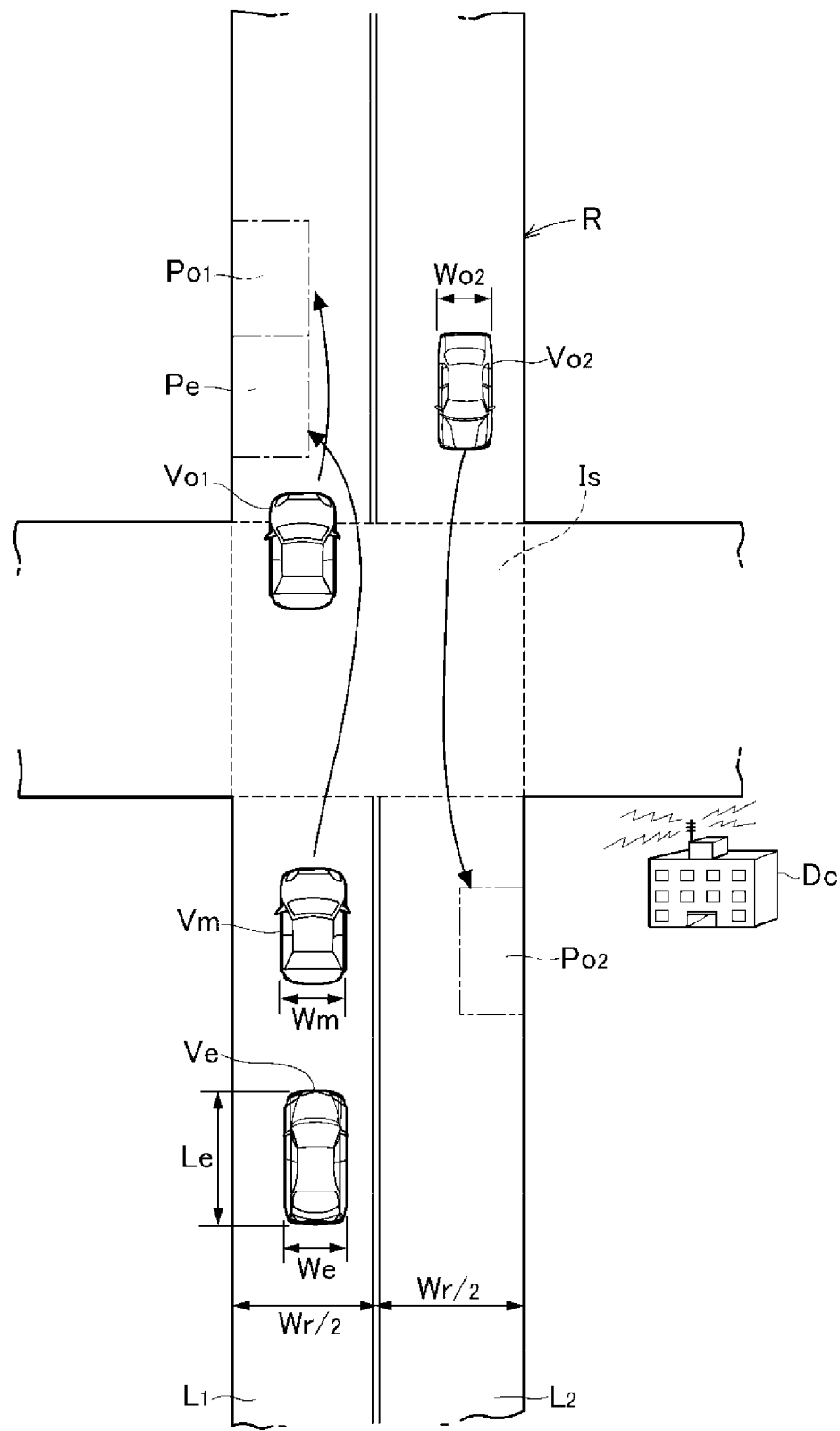
FIG. 1 is a schematic illustration showing an example of locations of vehicles and target zones for the vehicles to yield to an emergency vehicle on a single-lane road.

Embodiments of the present disclosure will now be explained with reference to the accompanying drawings. Referring now to FIG. 1, there is shown an example of a situation in which an emergency vehicle Ve such as an ambulance, a police car, a fire truck etc. approaches a vehicle Vm from behind. In such situation, the yielding action assistance system according to the present disclosure outputs information for assisting a driver of the vehicle Vm and the vehicle Vm to take an appropriate yielding action to clear the way for the emergency vehicle Vm. In the situation illustrated in FIG. 1, other vehicles Vo1 and Vo2 exist on a road R. In the following explanation, definition of the "other vehicle" includes a vehicle running on the road R in the same direction as the emergency vehicle Ve and the vehicle Vm, a vehicle running on an oncoming lane, and a vehicle stopping in any lane of the road R.

According to the present embodiment, the yielding action assistance system is installed at least partially in the vehicle Vm. The yielding action assistance system is configured to find a target zone Pe where the vehicle Vm stops or runs slowly to yield to the emergency vehicle Ve taking account of positional relationship among the emergency vehicle Ve and the other vehicles Vo, and guide the vehicle Vm to the target zone Pe. Specifically, the yielding action assistance system finds or selects the target zone Pe at a site where the vehicle Vm will not block the emergency vehicle Ve without interference with the other vehicles Vo, based on information about the emergency vehicle Ve, the other vehicles Vo, and the road R.

Figure 2:
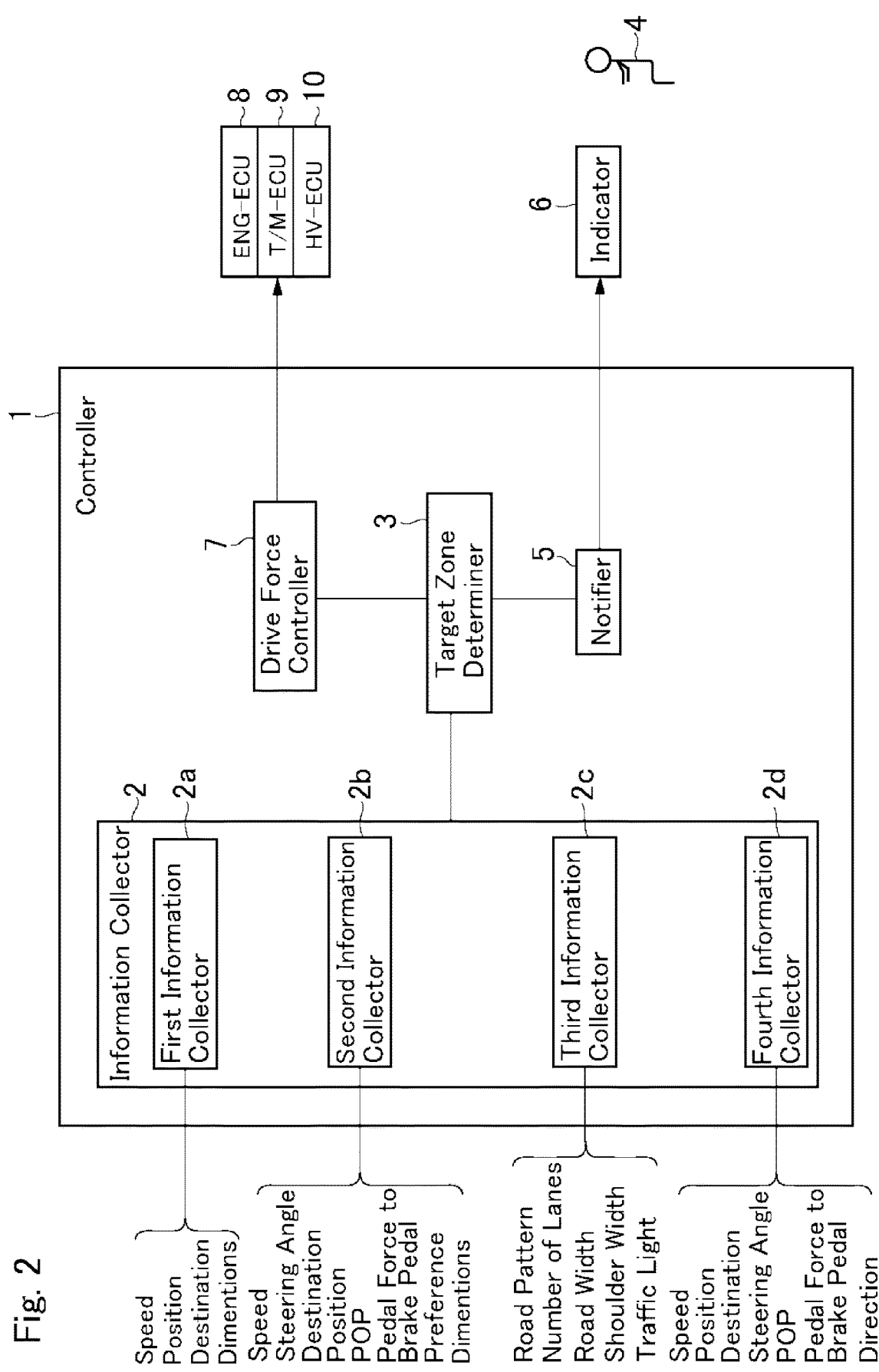
FIG. 2 is a block diagram showing a configuration of the controller.

Turning to FIG. 2, there are shown configurations and function of a controller 1 of the yielding action assistance system. An information collector 2 of the controller 1 comprises: a first information collector 2a that collects information about the emergency vehicle Ve; a second information collector 2b that collects information about the other vehicles Vo; a third information collector 2c that collects road information; and a fourth information collector 2d that collects information about the vehicle Vm. Specifically, the first information collector 2a collects information about a speed, a destination, a current position, a width, a length, etc., of the emergency vehicle Ve. The second information collector 2b collects information about a speed, a direction, a current position, a destination, a width, a length, a position of an accelerator pedal (not shown), a position of a brake pedal (not shown) or a pedal force applied to the brake pedal, a steering angle, a driving preference of a driver etc., of the other vehicle Vo. The third information collector 2c collects information about the road R on which the vehicle Vm and the emergency vehicle Ve travel, and a planned route of the emergency vehicle Ve. More specifically, the information about the road R includes a straightness, a curvature, an existence of an intersection, a number of lanes, a width of the road R, a width of the shoulder, a color of the traffic light, an existence of a center divider etc., within a range in which the emergency vehicle Ve overtakes the vehicle Vm or within a range slightly larger than such range. The fourth information collector 2d collects information about a speed, a direction, a current position, a destination, a width, a length, a position of an accelerator pedal (not shown), a position of a brake pedal (not shown) or a pedal force applied to the brake pedal, a steering angle etc., of the vehicle Vm.

For example, the above-mentioned information may be obtained from an external site Dc such as a datacenter holding big data through a communication means, and through an inter-vehicle communication with the emergency vehicle Ve and the other vehicle Vo. The above-mentioned information may also be obtained from a storage means installed in the vehicle Vm.

The controller 1 further comprises a target zone determiner 3 configured to determine the target zone Pe for the vehicle Vm to yield to the emergency vehicle Ve, based at least on the information about the road R and the other vehicles Vo1 and Vo2 collected by the information collector 2. Specifically, the target zone Pe is set based on: a condition of the road R; positions of the vehicle Vm, the emergency vehicle Ve, and the other vehicles Vo1 and Vo1; a travelling direction of the emergency vehicle Ve, and so on. Basically, the target zone Pe is set within the shoulder (or a side strip) of the road R, but various sites available to stop the vehicle Ve may be set as the target zone Pe. In the example shown in FIG. 1, the target zone Pe is set within the shoulder of the road R at a site possible to create a space for the emergency vehicle Ve to pass in the travel lane, outside of an intersection Is. The road R shown in FIG. 1 is a single-lane road including a first lane L1 and a second lane L2 opposed to each other without a center divider. In the road R, the target zone Pe is set to a site at which an available width for the emergency vehicle Ve to overtake can be maintained wider than a width (We) of the emergency vehicle Ve. Specifically, such available width can be calculated by subtracting a total width of a width (Wm) of the vehicle Vm and a width (Wo2) of the other vehicle Vo2 running on the oncoming second lane L2 from a total width (Wr) of the road R, as expressed by the following expression:

Available width=$(Wr-(Wm+Wo2))$; and the available width $(Wr-(Wm+Wo2))$ is wider than the width (We) of the emergency vehicle Ve, as expressed by the following inequality expression:

$(Wr-(Wm+Wo2))>We$.

In a case that the road R is divided by the center divider, the available width is calculated by subtracting the width (Wm) of the vehicle Vm from a width (Wr/2) of the first lane L1, as expressed by the following expression:

Available width=$(Wr/2-Wm)$.

In this case, the target zone Pe is also set to a site at which the available width can be maintained wider than the width (We) of the emergency vehicle Ve to satisfy the following inequality expression:

$(Wr/2-Wm)>We$.

Figure 3:
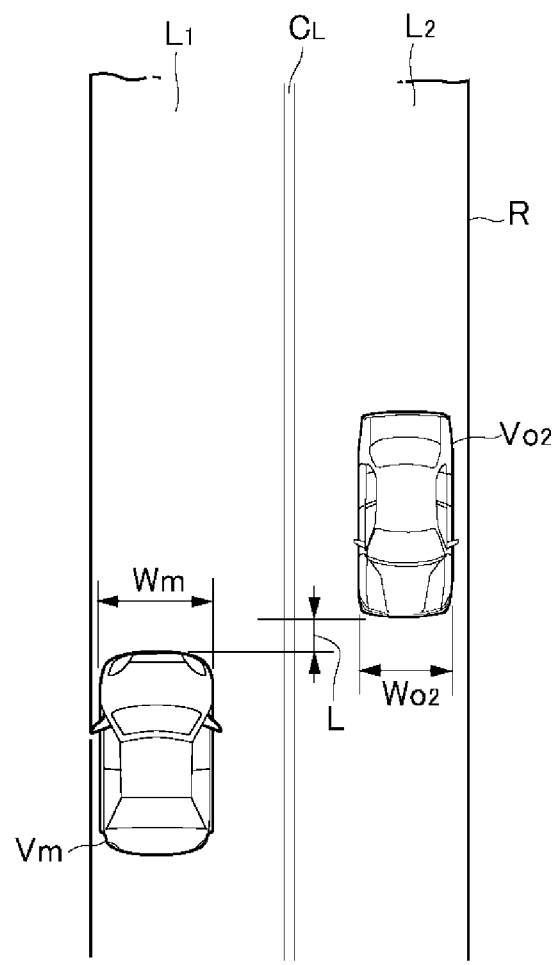
FIG. 3 is a schematic illustration showing a distance between the target zone for the vehicle and a stopping point of the vehicle running in an oncoming lane.

However, if the available width $(Wr-(Wm+Wo2))$ is narrower than the width (We) of the emergency vehicle Ve, and a distance between the target zone Pe for the vehicle Vm and a stopping point Pot of the other vehicle Vo1 in the oncoming second lane L2 in the direction of the road R is shorter than a length Le of the emergency vehicle Ve as illustrated in FIG. 3, it is difficult for the emergency vehicle Ve to pass between the vehicle Vm and the other vehicle Vo1. In order to avoid such disadvantage, the target zone determiner 3 is further configured to set the target zone Pe for the vehicle Vm to a site in the first lane L1 away from the stopping point Po2 in the oncoming second lane L2 more than the length Le of the emergency vehicle Ve.

In the road R, behavior of the other vehicles differ from one another. For example, some of the vehicles may yield to the emergency vehicle Ve, but some of the vehicles may not yield to the emergency vehicle Ve. In order to set the target zone Pe to a site at which the vehicle Vm is allowed to yield to the emergency vehicle Ve without interference with the other vehicles, the target zone determiner 3 presumes the stopping points of the other vehicles Vo1 and Vo1 based on the information about the speeds and the steering angles of the other vehicles Vo1 and Vo1 collected by the second information collector 2b. Such interference with the other vehicles may be avoided more certainly by setting the target zone Pe for the vehicle Vm based further on the road information collected by the third information collector 2c.

In the situation illustrated in FIG. 1, the other vehicle Vo1 running on the first lane L1 has already entered into the intersection Is earlier than the vehicle Ve. In this situation, it is expected that the other vehicle Vo1 passes through the intersection Is while increasing or maintaining a speed, and then pulls to a stopping pint Po1 in the shoulder of the first lane L1 to stop or to run slowly. Such movement of the other vehicle Vo1 and the stopping point Po1 are presumed or predicted based on the information collected by the second information collector 2b. On the other hand, the other vehicle Vo1 running on the oncoming second lane L2 is expected to pass through the intersection Is, and then pulls to the stopping point Po2 in the shoulder of the second lane L2 to stop or to run slowly. Such movement of the other vehicle Vo1 and the stopping point Po2 are also presumed or predicted based on the information collected by the second information collector 2b.

In the situation illustrated in FIG. 1, the vehicle Vm has not yet entered into the intersection Is. In this situation, therefore, the target zone Pe for the vehicle Ve may be set in front of the intersection Is. However, if the target zone Pe for the vehicle Vm is set in front of the intersection Is, the target zone Pe and the stopping point Po2 at which the other vehicle Vo1 is expected to stop would be situated next to each other in a width direction of the road R, and hence the available width between the target zone Pe and the stopping point Po2 would be too narrow for the emergency vehicle Ve to pass therebetween. In other words, the distance between the target zone Pe and the stopping point Po2 for the other vehicle Vo1 in the direction of the road R would be shorter than the length Le of the emergency vehicle Ve. In order to avoid such disadvantage, the target zone Pe for the vehicle Vm is set further than the intersection Is and behind the expected stopping point Po1 of the other vehicle Vo1. However, if the other vehicles Vo1 and Vo1 do not move onto the stopping points Po1 and Po2 against expectations, the vehicle Vm may not be allowed to pull over to the target zone Pe. The target zone determiner 3 updates the target zone Pe and the stopping points Po1 and Po2 continuously based on the information about the other vehicles Vo1 and Vo1. In other words, the target zone Pe is updated continuously according to the current situation.

Figure 4:
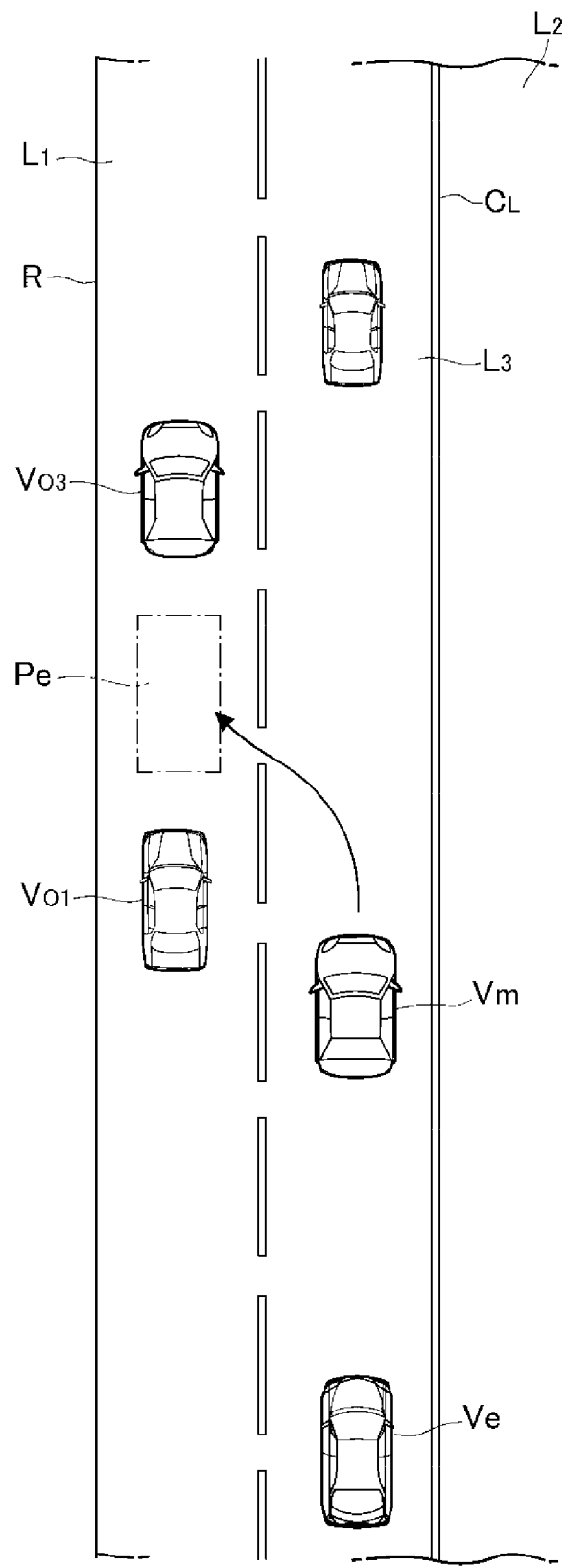
FIG. 4 is a schematic illustration showing an example of locations of vehicles and target zones for the vehicles to yield to an emergency vehicle on a multi-lane road.

In a case that the road R is a multi-lane road as illustrated in FIG. 4, the emergency vehicle Ve is allowed to overtake other vehicles smoothly by clearing an inner lane L3 adjacent to the center line CL. In the situation illustrated in FIG. 4, the target zone determiner 3 sets the target zone Pe within the first lane L1 (i.e., an outer lane) between the other vehicles Vo1 and Vo3. In other words, the target zone Pe is set within the lane other than the innermost lane L3. In this case, the vehicle Vm will not stop at the target zone Pe but runs slowly at the target zone Pe in formation with the other vehicles Vo1 and Vo3. Such control may be executed only in a case that both of the vehicle Vm and the emergency vehicle Ve are in the inner lane L3. If the emergency vehicle Ve runs on the shoulder for some reason, the target zone Pe may be set between the other vehicles Vo1 and Vo3 other than the first lane L1.

In order to assist a driver 4 of the vehicle Vm to take an appropriate action in yielding to the emergency vehicle Ve, the controller 1 further comprises a notifier 5 that warns the driver 4 of the vehicle Vm to guide the driver 4 to pull over to the target zone Pe. The notifier 5 is configured to warn the driver 4 by an audio or visible message, or by controlling a steering force. According to the embodiment, the notifier 5 is configured to indicate a map identifying a route from a current position of the vehicle Vm to the target zone Pe on an indicator 6 such as a liquid-crystal monitor or a head-up display. Alternatively, the notifier 5 may also be configured to apply a steering force in such a manner as to guide the vehicle Vm to the target zone Pe while controlling direction indicator lamps. According to the embodiment, therefore, the driver 4 of the vehicle Vm is allowed to pull over to the target zone Pe smoothly in accordance with the guidance so as to yield to the emergency vehicle Ve.

In order to yield to the emergency vehicle Ve, the vehicle Vm is required to reduce the speed. To this end, the controller 1 further comprises a drive force controller 7 configured to control a relation between a position of the accelerator pedal and a drive force to be generated, and a relation between an operating amount of the brake pedal and a brake force to be generated, when yielding to the emergency vehicle Ve. For example, the drive force controller 7 may be configured to increase deceleration force when yielding to the emergency vehicle Ve.

The drive force and the deceleration force are changed in accordance with an output power of an engine, a speed ratio of a transmission, and a drive force or a regenerative force of a motor used in a hybrid vehicle (neither of which are shown). In order to control the drive force and the deceleration force, the drive force controller 7 transmits command signals to an engine controller (referred to as ENG-ECU in FIG. 2) 8, a transmission controller (referred to as T/M-ECU in FIG. 2) 9, and a hybrid controller (referred to as HV-ECU in FIG. 2) 10.

When stopping the vehicle Vm to yield to the emergency vehicle Ve, the target zone Pe where the vehicle Vm is stopped is set by the target zone determiner 3. In this situation, the deceleration force is increased by reducing the output power of the engine, by increasing the speed ratio of the transmission to increase an engine braking force, by increasing a regenerative braking force of the regenerative motor, or by increasing the brake force with respect to a pedal force applied to the brake pedal. Here, it is to be noted that an increasing amount of the deceleration force and a timing to increase the deceleration force are adjustable depending on a distance to the target zone Pe and a current speed of the vehicle Vm. For example, the deceleration force may be increased when the distance to the target zone Pe reaches a threshold value. The threshold value is also adjustable depending on a speed of the vehicle Ve. Specifically, the threshold value may be increased with an increase in the speed of the vehicle Ve. In addition, a reduction amount of the deceleration force may be reduced if the distance to the target zone Pe is long. In other words, the reduction amount of the deceleration force may be increased if the distance to the target zone Pe is short.

Otherwise, when changing a lane to yield to the emergency vehicle Ve without stopping the vehicle Ve, the deceleration force is increased after the vehicle Vm arrives at the target zone Pe so as to drive the vehicle Ve cooperatively with the other vehicles.

All of the information collector 2, the target zone determiner 3, the notifier 5, and the drive force controller 7 of the controller 1 may be installed in the vehicle Vm. Instead, a predetermined component(s) of the controller 1 may be installed in the external site Dc according to a data processing capacity of the vehicle Vm and a data communication capacity of the communication means. For example, at least part of the information collector 2 and the target zone determiner 3 may be installed in the external site Dc, and the remaining components of the controller 1 may be installed in the vehicle Vm.

Figure 5:
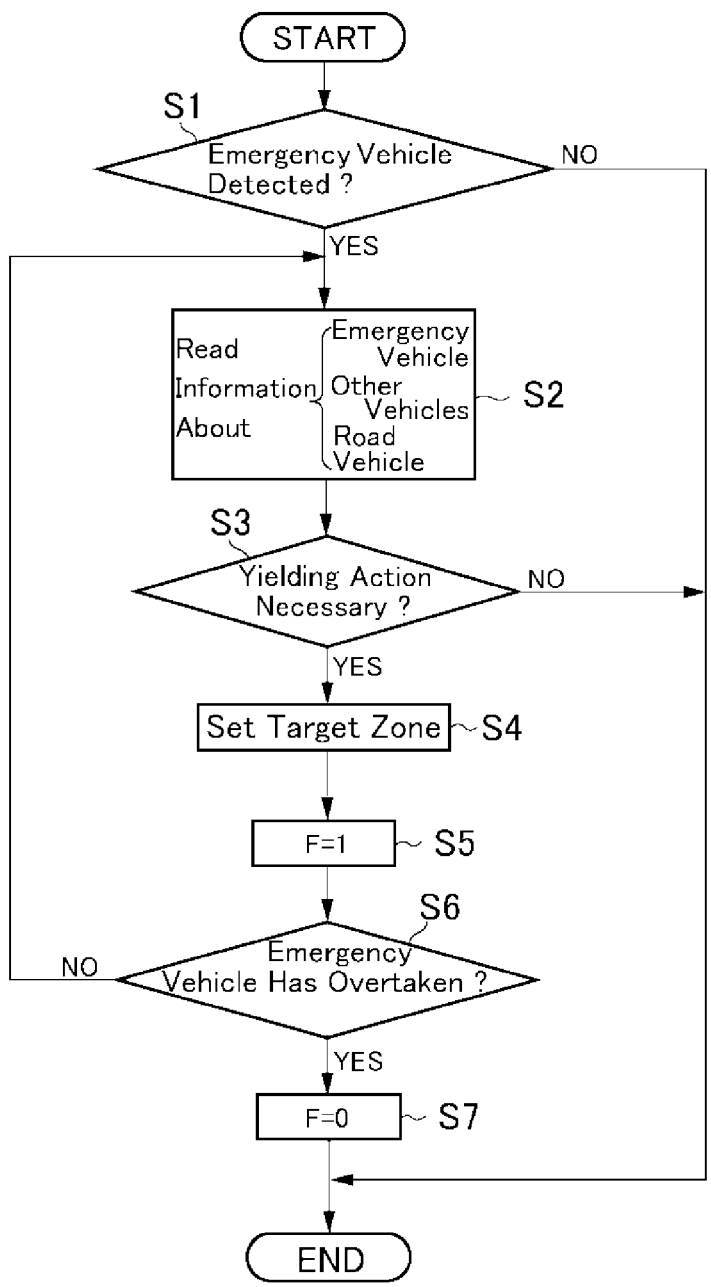
FIG. 5 is a flowchart showing a routine for setting the target zone to yield to the emergency vehicle.

Here will be explained a routine for setting the target zone Pe with reference to FIG. 5, and the routine shown in FIG. 5 is repeated at predetermined intervals. At step S1, a proximity of the emergency vehicle Ve to the vehicle Vm is determined based on the positional information of the emergency vehicle Ve collected by the first information collector 2a, and the positional information of the vehicle Vm collected by the fourth information collector 2d. Accordingly, the first information collector 2a and the fourth information collector 2d serve as a detector of the present embodiment. If the answer of step S1 is NO, the routine returns without executing any specific control. By contrast, if the emergency vehicle Ve approaches the vehicle Vm so that the answer of step S1 is YES, the routine progresses to step S2 to obtain information about the emergency vehicle Ve, the other vehicles Vo1 and Vo1, the road R, and the vehicle Vm.

Then, at step S3, it is determined whether the vehicle Vm is required to yield to the emergency vehicle Ve. For example, the answer of step S3 will be YES if the vehicle Vm travels on the planned route of the emergency vehicle Ve. If the road R is a multi-lane road and both lanes are occupied by the other vehicles Vo1 and Vo1, the answer of step S3 will also be YES even if the vehicle Vm travels on the different lane from the lane on which the emergency vehicle Ve travels. Otherwise, if a planned route of the vehicle Vm and the planned route of the emergency vehicle V do not intersect with each other, the answer of step S3 will be NO. For example, the answer of step S3 will be NO in a case that the vehicle Vm takes a right or left turn at the intersection Is and the emergency vehicle Ve goes straight down the intersection Is, in a case that the emergency vehicle Ve takes a right or left turn at the intersection Is and the vehicle Vm goes straight down the intersection Is, and in a case that a destination of the emergency vehicle Ve is behind the vehicle Vm.

If the answer of step S3 is NO, the routine returns without executing any specific control. By contrast, if the answer of step S3 is YES, the routine progresses to step S4 to set the target zone Pe by the above-explained procedures. Then, the routine progresses to step S5 to set a flag F representing a completion of setting of the target zone Pe to "1". Here, it is to be noted that the flag F is set to "0" in a normal situation in which there is no need to set the target zone Pe.

Then, it is determined at step S6 whether the emergency vehicle Ve has overtaken the vehicle Vm based on the information about the emergency vehicle Ve collected by the first information collector 2a. If the answer of step S6 is NO, it is expected that the emergency vehicle Ve passes by the vehicle Vm and hence the routine returns to step S2 to continue the yielding action of the vehicle Vm. In this case, if the speed and/or the steering angle of the other vehicle Vo1 or Vo1 have/has been changed, the estimated stopping point Po1 of the other vehicle Vo1 or the estimated stopping point Po2 of the other vehicle Vo1 is updated based on the updated information of the other vehicle Vo1 or Vo1. Then, the target zone Pe for the vehicle Vm is updated based on the updated stopping point Po1 of the other vehicle Vo1 or the updated stopping point Po2 of the other vehicle Vo1. Such update of the target zone Pe for the vehicle Vm is repeated until the emergency vehicle Ve overtakes the vehicle Vm.

By contrast, if the emergency vehicle Ve has overtaken the vehicle Vm so that the answer of step S6 is YES, the routine progresses to step S7 to reset the flag F representing a completion of setting of the target zone Pe to "0", and thereafter returns.

Figure 6:
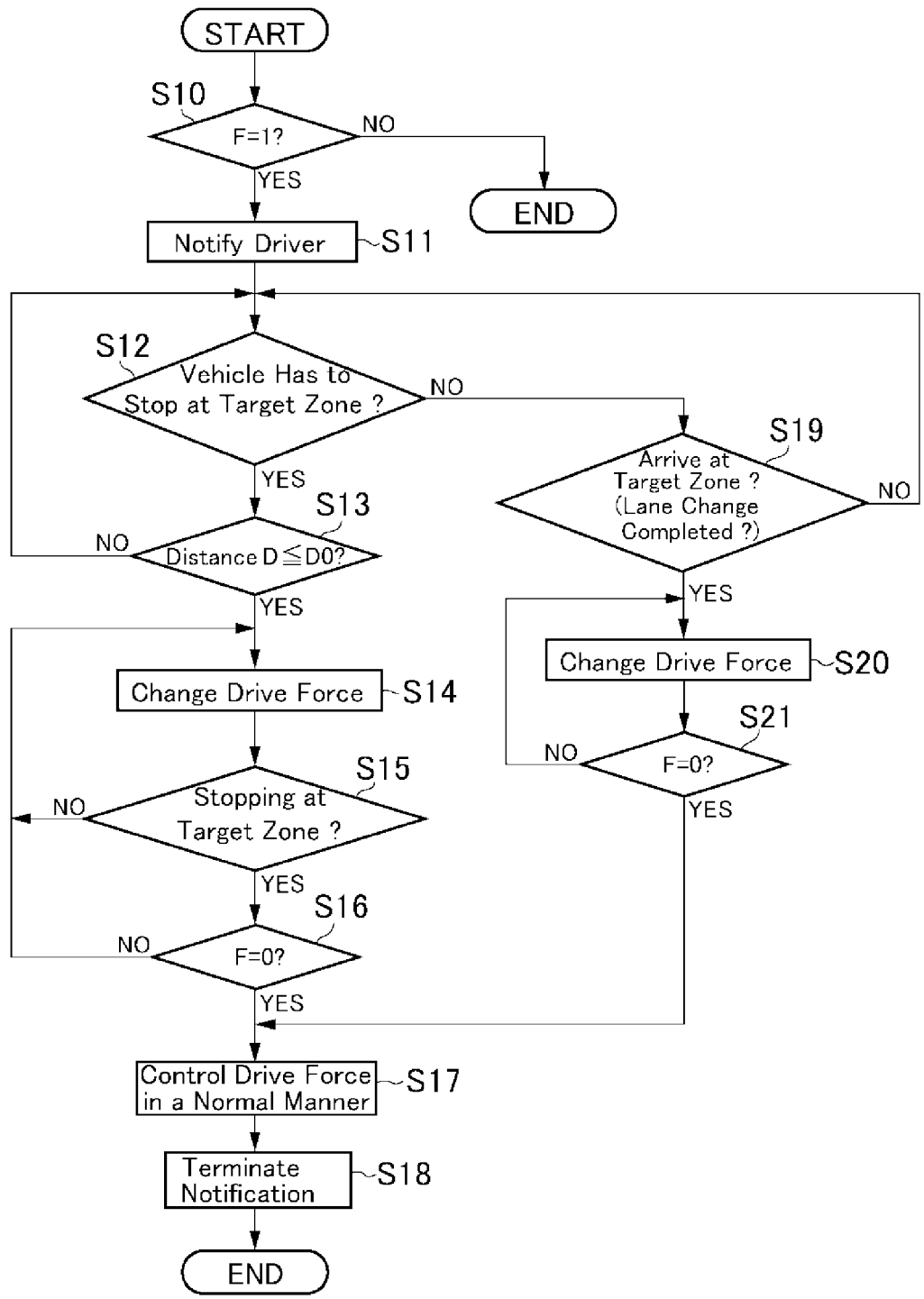
FIG. 6 is a flowchart showing a routine for warning the driver and controlling a drive force to the emergency vehicle.

Turning to FIG. 6, there is shown a routine for notifying the driver 4 of the proximity of the emergency vehicle Ve and changing the drive force to yield to the emergency vehicle, that is executed in conjunction with the routine shown in FIG. 5. In the routine shown in FIG. 6, it is determined at step S10 whether the flag F is set to "1". If the flag F is set to "1" so that the answer of step S10 is YES, the routine progresses to step S11 to inform the driver 4 about the target zone Pe. By contrast, if the answer of step S10 is NO, the routine returns.

Then, it is determined at step S12 whether the driver 4 is required to stop the vehicle Vm at the target zone Pe. As described, if the road R is a single-lane road, the vehicle Vm is required to pull over to the target zone Pe thereby clearing the way for the emergency vehicle Ve. In this case, the answer of step S12 will be YES. By contrast, the road R is a multi-lane road, it may be possible to yield to the emergency vehicle Ve by pulling into another lane while running slowly. In this case, the answer of step S12 will be NO.

Figure 7:
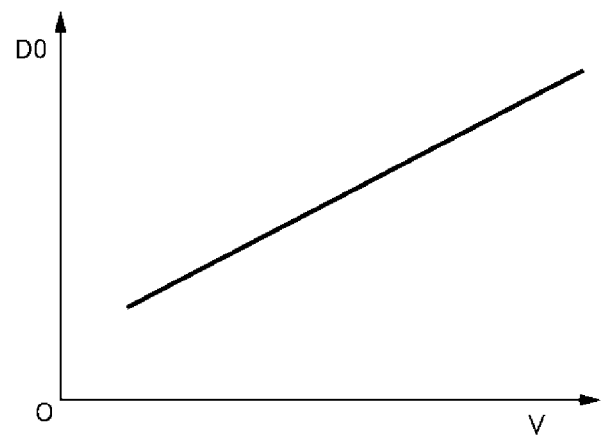
FIG. 7 is a graph indicating a relation between a threshold distance to the target zone and a vehicle speed.

If the answer of step S12 will be YES, the routine progresses to step S13 to determine whether a distance D to the target zone Pe is equal to or shorter than a threshold distance D0. Such determination at step S13 is made to determine a timing to change the drive force to increase the deceleration force. In order to avoid an abrupt deceleration of the vehicle Vm, as shown in FIG. 7, the threshold distance D0 may be increased with an increase in the speed V of the Vehicle Vm. Consequently, a deceleration rate (i.e., a reduction rate of the vehicle speed) of the vehicle Vm when pulling over to the target zone Pe may be substantially equalized regardless of the situation.

If the distance D to the target zone Pe is still shorter than the threshold distance D0 so that the answer of step S13 is NO, the routine returns to step S12 to repeat the above-explained determination at step S12. By contrast, if the distance D to the target zone Pe is equal to or shorter than the threshold distance D0 so that the answer of step S12 is YES, the routine progresses to step S14 to change the drive force of the vehicle Vm to increase the deceleration force. Then, it is determined at step S15 whether the vehicle Vm arrives and stops at the target zone Pe based on the positional information and the current speed V of the vehicle Vm.

If the answer of step S15 is NO, the routine returns to step S14 to control the drive force of the vehicle Vm continuously. By contrast, if the answer of step S15 is YES, the routine progresses to step S16 to determine whether the flag F is set to "0". As described, the flag F is reset to "0" when the emergency vehicle Ve overtakes the vehicle Vm stopping at the target zone Pe. That is, at step S16, it is determined whether the emergency vehicle Ve has overtaken the vehicle Vm. If the answer of step S16 is NO, the routine returns to step S14 to control the drive force of the vehicle Vm continuously, or to step S15 to instruct the driver 4 of the vehicle Vm to stay in the target zone Pe continuously.

By contrast, if the answer of step S16 is YES, the routine progresses to step S17 to control the drive force of the vehicle Vm in a normal manner, and further progresses to step S18 to terminate the notification. Thereafter, the routine returns.

Otherwise, if it is possible to yield to the emergency vehicle Ve while driving the vehicle Vm at a low speed so that the answer of step S12 is NO, the routine progresses to step S19 to determine whether the vehicle Ve has arrived at the target zone Pe based on the positional information of the vehicle Vm. At step S19, specifically, it is determined whether the lane change of the vehicle Vm has been completed. If the answer of step S19 is NO, the routine returns to step S12 to repeat the above-explained determination at step S12. By contrast, if the answer of step S19 is YES, the routine progresses to step S20 to change the drive force of the vehicle Vm to increase the deceleration force. At the foregoing step S14, the drive force of the vehicle Vm is changed to stop the vehicle Vm. On the other hand, at step S20, the drive force of the vehicle Vm is changed in such a manner as to propel the vehicle Vm at a low speed. To this end, therefore, an increasing amount of the deceleration force at step S20 may be smaller than an increasing amount of the deceleration force at step S14.

Then, it is determined at step S21 whether the flag F is reset to "0". That is, it is determined whether the emergency vehicle Ve has overtaken the vehicle Vm. If the answer of step S21 is NO, the routine returns to step S20 to control the drive force of the vehicle Vm continuously. By contrast, if the answer of step S20 is YES, the routine progresses to step S17 to terminate the yielding action assisting control and further progresses to step S18 to terminate the notification. Thereafter, the routine returns.

Figure 8:
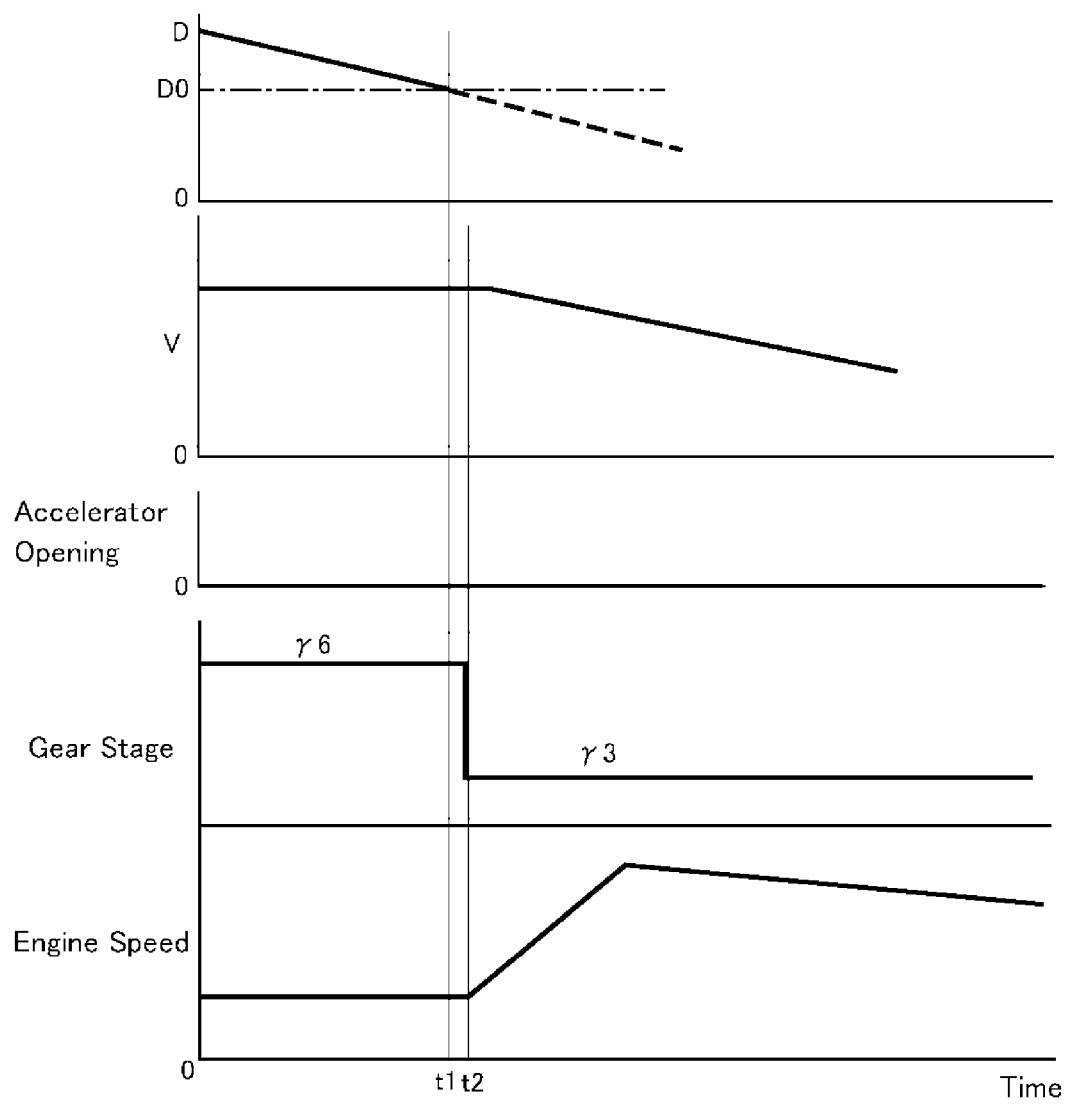
FIG. 8 is a time chart showing temporal changes in a speed ratio of a transmission, an engine speed etc. during execution of the routines shown in FIGS. 5 and 6.

Turning to FIG. 8, there is shown a time chart during execution of the yielding action assisting control to stop the vehicle Vm at the target zone Pe. When the emergency vehicle Ve is detected, the target zone Pe is set and the driver 4 of the vehicle Ve is informed about the location of the target zone Pe. Consequently, the driver 4 returns the accelerator pedal so that an opening degree of the accelerator is "0". In this situation, if the vehicle Vm propels at a speed close to a speed limit of the road R, a speed ratio (or a gear stage) of the transmission is set to the highest stage $Y^6$. That is, the speed ratio of the transmission is reduced to a substantially smallest ratio and hence an engine braking force applied to the vehicle Vm is weak. In this situation, therefore, the vehicle speed V and an engine speed are maintained constant.

When the distance D to the target zone Pe reaches the threshold distance D0 at point t1, the routine progressed from step S13 to step S14 and a downshift command is transmitted at point t2 to increase the deceleration force. Consequently, the gear stage of the transmission is shifted from the highest stage $Y^6$ to a mid-low stage $Y^3$ to increase the speed ratio so that the engine braking force is increased. As a result, the engine speed is raised, a reduction rate of the vehicle speed V is increased, and a reduction rate of the distance D to the target zone Pe is reduced. In this situation, the engine speed is increased in accordance with the speed ratio after the downshifting, and then drops with a reduction in the vehicle speed V. Thus, the vehicle speed V is reduced gradually by increasing the deceleration force so that the vehicle Ve is allowed to pull over to the target zone Pe slowly. According to the embodiment, therefore, a behavior of the vehicle Ve will not be changed abruptly when yielding to the emergency vehicle Ve.

Although the above exemplary embodiments of the present disclosure have been described, it will be understood by those skilled in the art that the present disclosure should not be limited to the described exemplary embodiments, and various changes and modifications can be made within the scope of the present disclosure.

For example, the yielding action assistance system may be modified to increase the deceleration force when the other vehicle Vo1 or Vo2 comes close to the vehicle Vm. In addition, the yielding action assistance system may be modified to increase the deceleration force at a timing at which the emergency vehicle Ve passes by the vehicle Vm. Optionally, the drive force of the vehicle Vm may be reduced to "0" while the vehicle Ve stops at the target zone Pe by stopping the engine, by bringing the transmission into a neutral state, or by activating a parking brake.

What is claimed is:

1. A yielding action assistance system that assists a vehicle to yield to a passing emergency vehicle, comprising:
    a detector that detects a proximity of the emergency vehicle to the vehicle;
    an information collector that collects information about a road on which the vehicle travels, and information about the emergency vehicle and other vehicle travelling on the same road with the vehicle;
    a target zone determiner that sets a target zone to pull over the vehicle to clear the way for the emergency vehicle based on the information about the other vehicle and the road, and that updates the target zone continuously based at least on the information about the other vehicle; and
    a notifier that informs a driver about the target zone,
    wherein the information collector is configured to collect information about the emergency vehicle and the vehicle, and
    wherein the target zone determiner is configured to update the target zone until the emergency vehicle overtakes the vehicle.

2. The yielding action assistance system according to claim 1, wherein the target zone determiner is further configured to set the target zone in a shoulder of the road at a site at which a width of the target zone can be maintained wider than a width of the emergency vehicle, and a distance between the vehicle and the other vehicle to be stopped in an oncoming lane is maintained longer than a length of the emergency vehicle.

3. The yielding action assistance system according to claim 1, further comprising:
    a first drive force controller that changes a drive force to increase a deceleration force when the driver pulls over the vehicle to the target zone indicated by the notifier.

4. The yielding action assistance system according to claim 2, further comprising:
    a first drive force controller that changes a drive force to increase a deceleration force when the driver pulls over the vehicle to the target zone indicated by the notifier.

5. The yielding action assistance system according to claim 3, wherein the first drive force controller is configured to:
    calculate a distance between the vehicle and the target zone; and
    change the drive force when the distance between the vehicle and the target zone is reduced to a threshold value.

6. The yielding action assistance system according to claim 4, wherein the first drive force controller is configured to:
    calculate a distance between the vehicle and the target zone; and
    change the drive force when the distance between the vehicle and the target zone is reduced to a threshold value.

7. A yielding action assistance system that assists a vehicle to yield to a passing emergency vehicle, comprising:
    a detector that detects a proximity of the emergency vehicle to the vehicle;
    an information collector that collects information about a road on which the vehicle travels, and information about the emergency vehicle and other vehicle travelling on the same road with the vehicle;
    a target zone determiner that sets a target zone to pull over the vehicle to clear the way for the emergency vehicle based on the information about the other vehicle and the road, and that updates the target zone continuously based at least on the information about the other vehicle; and
    a notifier that informs a driver about the target zone,
    wherein the target zone determiner is further configured to set the target zone in a shoulder of the road at a site at which a width of the target zone can be maintained wider than a width of the emergency vehicle, and a distance between the vehicle and the other vehicle to be stopped in an oncoming lane is maintained longer than a length of the emergency vehicle.

8. The yielding action assistance system according to claim 7, further comprising:
    a first drive force controller that changes a drive force to increase a deceleration force when the driver pulls over the vehicle to the target zone indicated by the notifier.

9. The yielding action assistance system according to claim 8, wherein the first drive force controller is configured to;
    calculate a distance between the vehicle and the target zone; and
    change the drive force when the distance between the vehicle and the target zone is reduced to a threshold value.

10. A yielding action assistance system that assists a vehicle to yield to a passing emergency vehicle, comprising:
    a detector that detects a proximity of the emergency vehicle to the vehicle;
    an information collector that collects information about a road on which the vehicle travels, and information about the emergency vehicle and other vehicle travelling on the same road with the vehicle;

a target zone determiner that sets a target zone to pull over the vehicle to clear the way for the emergency vehicle based on the information about the other vehicle and the road, and that updates the target zone continuously based at least on the information about the other vehicle;

a notifier that informs a driver about the target zone; and a first drive force controller that changes a drive force to increase a deceleration force when the driver pulls over the vehicle to the target zone indicated by the notifier, wherein the first drive force controller is further configured to:

calculate a distance between the vehicle and the target zone;

change the drive force when the distance between the vehicle and the target zone is reduced to a threshold value;

detect a speed of the vehicle; and increase the threshold value with an increase in the speed of the vehicle.

11. A yielding action assistance system that assists a vehicle to yield to a passing emergency vehicle, comprising:

a detector that detects a proximity of the emergency vehicle to the vehicle;

an information collector that collects information about a road on which the vehicle travels, and information about the emergency vehicle and other vehicle travelling on the same road with the vehicle;

a target zone determiner that sets a target zone to pull over the vehicle to clear the way for the emergency vehicle based on the information about the other vehicle and the road, and that updates the target zone continuously based at least on the information about the other vehicle;

a notifier that informs a driver about the target zone; and a first drive force controller that changes a drive force to increase a deceleration force when the driver pulls over the vehicle to the target zone indicated by the notifier, wherein the first drive force controller is further configured to:

calculate a distance between the vehicle and the target zone; and change the drive force to increase the deceleration force with a reduction in the distance between the vehicle and the target zone.

12. A yielding action assistance system that assists a vehicle to yield to a passing emergency vehicle, comprising:

a detector that detects a proximity of the emergency vehicle to the vehicle;

an information collector that collects information about a road on which the vehicle travels, and information about the emergency vehicle and other vehicle travelling on the same road with the vehicle;

a target zone determiner that sets a target zone to pull over the vehicle to clear the way for the emergency vehicle based on the information about the other vehicle and the road, and that updates the target zone continuously based at least on the information about the other vehicle; and a notifier that informs a driver about the target zone, wherein the target zone determiner is further configured to set the target zone in a lane other than an innermost lane while avoiding interference with the other vehicle, in a case that the vehicle travels on a multi-lane road, and wherein the yielding action assistance system further comprises a second drive force controller that changes a drive force to increase a deceleration force after the vehicle arrives at the target zone.

13. The yielding action assistance system according to claim 12, further comprising:

a first drive force controller that changes a drive force to increase a deceleration force when the driver pulls over the vehicle to the target zone indicated by the notifier.

14. The yielding action assistance system according to claim 13, wherein the first drive force controller is configured to;

calculate a distance between the vehicle and the target zone; and change the drive force when the distance between the vehicle and the target zone is reduced to a threshold value.

* * * * *